Nov. 12, 1935.                J. H. KERBER                 2,020,555
                              ROTARY SCRAPER
                          Filed Aug. 28, 1933              2 Sheets-Sheet 1
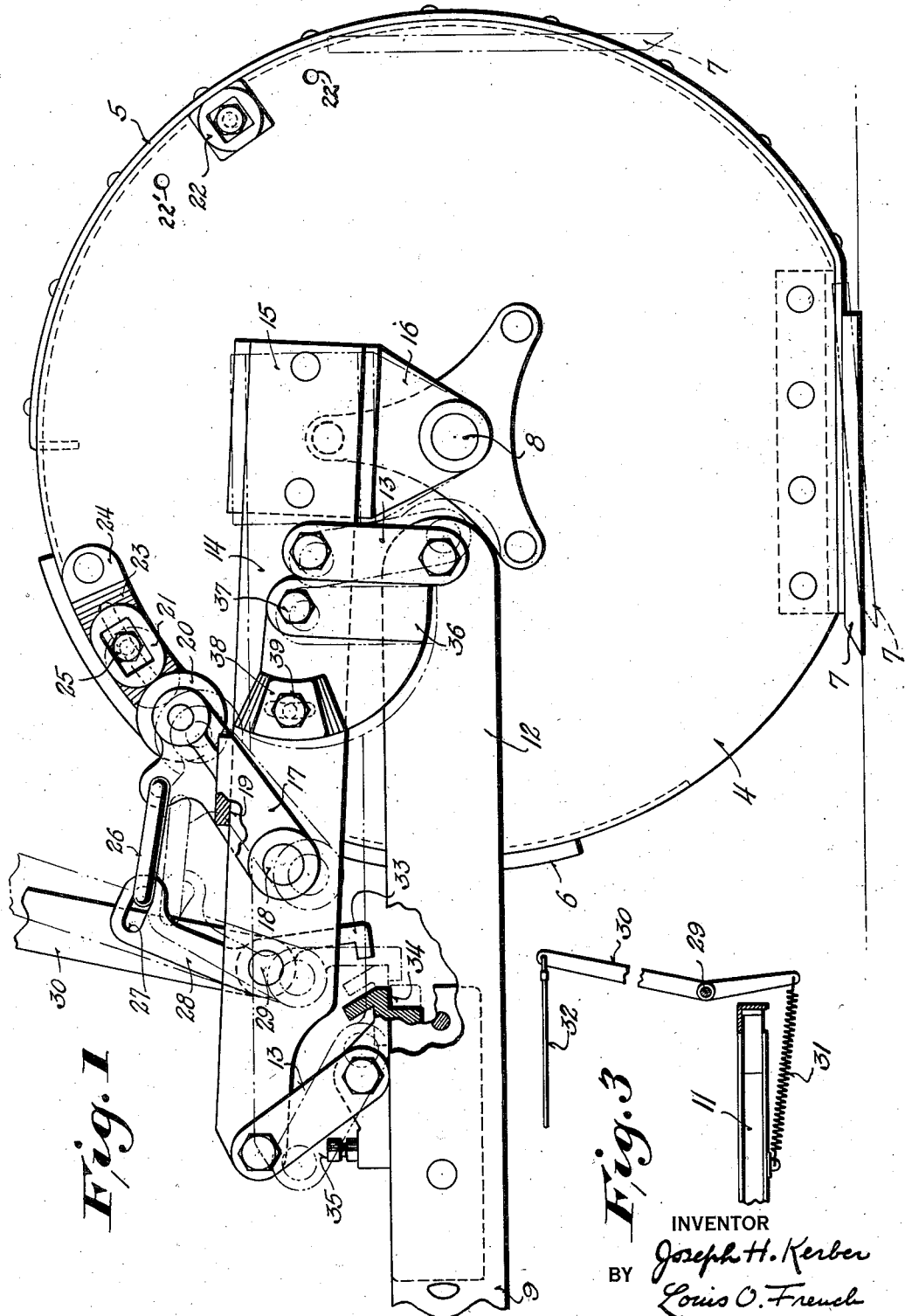
INVENTOR
Joseph H. Kerber
BY Louis O. French
ATTORNEY

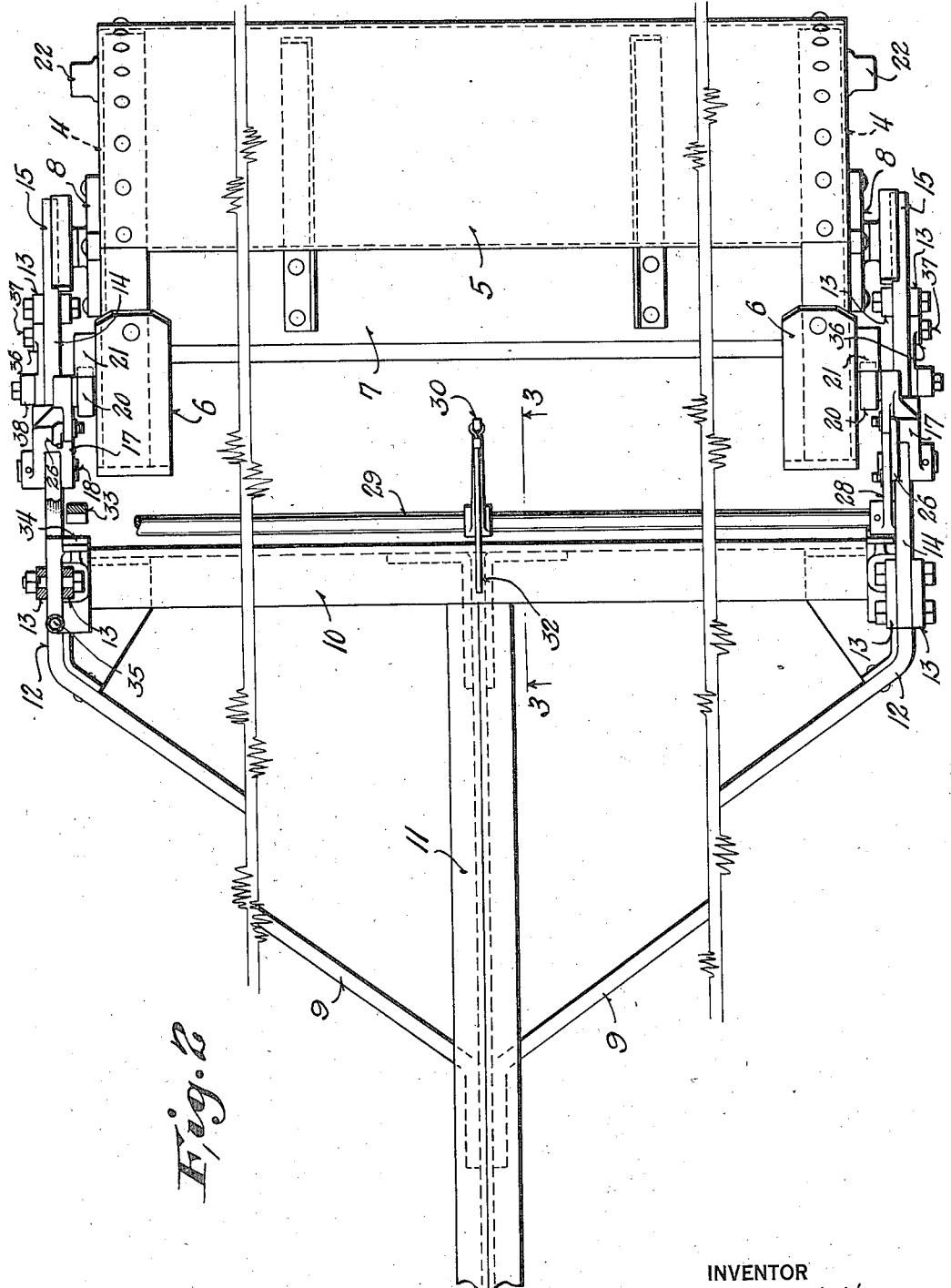

Patented Nov. 12, 1935

2,020,555

UNITED STATES PATENT OFFICE 2,020,555

ROTARY SCRAPER

Joseph H. Kerber, Milwaukee, Wis., assignor to Hi-Way Service Corporation, Milwaukee, Wis., a corporation of Wisconsin Application August 28, 1933, Serial No. 687,057

7 Claims. (Cl. 37—140)

The invention relates to rotary scrapers.

The object of the invention is to provide a rotary scraper wherein the movements of the scraper bucket to its different positions are controlled by mechanism which is positive in its action.

A further object of the invention is to provide a rotary scraper wherein the hauling bail has a linked connection with the bucket which cooperates with stop mechanism to control the movements of the bucket.

A further object of the invention is to provide a rotary scraper wherein the momentum of the rotary bucket is used to bring the scraper to its digging position.

The invention further consists in the several features hereinafter set forth and more particularly defined by claims at the conclusion hereof.

In the drawings:

Fig. 1 is a side elevation view of a rotary scraper embodying the invention;

Fig. 2 is a plan view of the device, parts being broken away and parts being shown in section;

Fig. 3 is a detail sectional view taken on the line 3—3 of Fig. 2.

Referring to the drawings, the scraper bucket, as usual, includes the end plates 4, the body plate 5, the shoes 6, the scraper blade 7 and the trunnions 8 secured to said end plates.

A hauling bail 9, forming part of the hauling frame, is reinforced by the transverse frame bar 10 and the centrally disposed frame bar 11 to which a drawbar hitch of any suitable construction is secured. Each arm 12 of the hauling bail is connected by links 13 to opposite end portions of a control bar 14 whose end 15 has a trunnion bearing portion 16 for the cooperative trunnion 8.

The scraper bucket has a dragging position, a digging position, and a spreading position. The movement of the bucket to digging and spreading positions is brought about by the tendency of the bucket to revolve in a counterclockwise direction, as viewed in Fig. 1, when the device is hauled forward, and means hereinafter described are associated with the hauling connections above described and cooperate with stops on the bucket to hold it in the positions above named.

The stop lever 17 is pivotally connected to each control bar 14 by a pivot pin 18 and has a yoke portion 19 adapted to engage said bar and carries a roller 20 engageable with either the digging stop 21 or the spreading stop 22 secured to the adjacent end plate 4 of the bucket. The digging stop 21 is adjustably secured to the bucket by having a serrated face engageable with the serrated face 23 of a plate 24 secured to the bucket, said stop 21 being clamped in adjusted position to the plate 24 by a bolt 25. The spreading stop 22 is adjustably secured to the bucket by providing angularly spaced holes 22' for the clamping bolt of said stop.

Each lever 17 is connected by a link 26 to the slotted end 27 of a trip lever 28 mounted on a trip shaft 29 pivotally mounted at its ends in the bars 14.

The trip shaft 29 is turned by the operation of release lever 30 secured intermediate its ends thereto, the lower arm of said lever being connected to the hauling frame member 11 by a spring 31, the upper end of said lever having an operating cable 32 connected thereto.

Each trip lever 28 has a latch arm 33 formed integral therewith and adapted to engage a keeper 34 secured to the hauling frame member 10 adjacent the arm 12 when the bar 14 associated with said lever is moved to a digging position. When in its lowered position, movement of the outer end of each bar 14 is limited by the adjustable stop bolt 35 mounted on a part of the hauling frame.

When in its upper position, movement of each bar 14 relative to the hauling frame is limited by the engagement of the links 13 at the inner end 15 of each bar with a stop member 36. Each stop member 36 is mounted to swing on a bolt 37 carried by the bar 14 and is secured in various angular positions by a locking nut 38 having an adjustable serrated faced engagement with a part of the member 36 and clamped thereto by a clamping bolt 39.

The dragging position of the scraper bucket and its hauling frame is shown in full lines in Fig. 1 and it will be noted that the latch arm 33 is in a release position and that the roller 20 of the stop lever 17 is engaged with the stop 21 on the bucket and that the rear link 13 is engaging the stop 36. Consequently, while the bucket tends to turn so as to swing the blade 7 downward, this tendency is resisted by the action of the hauling frame through the links 13 upon the bars 14 tending to swing said bars upwardly and thus maintain the stop roller 20 in the position shown, it being noted that under these conditions the rear links 13 engage the stops 36 so that the bars 14 and arms 12 associated with these parts act as a unit to pull the bucket along the ground. The bucket is brought to its dragging position from its digging position.

With the bucket in the dragging position shown in full lines in Fig. 1, it is moved by the traction device to the place where it is desired to deposit the load and the controls are then operated to bring the bucket to a spreading position. This is brought about by swinging the upper arm of the release lever 30 toward the left from the full line position shown causing the levers 28 to pull on the links 26 and swing the levers 17 upwardly so as to move the rollers 20 out of engagement with the stops 21 and allow the bucket to turn until the stops 22 come into engagement with the stop rollers 20 which have been returned to initial full line position through the return movement of the release lever 30 to the position shown. In its spreading position the bucket slides on the shoes 6 and the blade 7 is in a downwardly inclined position as shown, for example, by the vertically inclined position shown by dotted lines in Fig. 1. The operator carries the bucket in its spreading position until he is ready to dig.

When he is ready to dig the lever 30 is again moved toward the left so as to act through the levers 28 and links 26 to move the levers 17 upwardly to a release position so that the rollers 20 are moved out of engagement with the stops 22 and then as the assembly is dragged forwardly the bucket is turned about its pivotal mounting until the stops 21 again come to an operative position. As soon as the rollers 20 have been released from the stops 22 so as to permit this turning action the lever 30 is moved so as to bring the stop lever 17 again to an operative position. In the return of the levers 17 by the operation of the lever 30 the lost motion in the connection between the links 26 and the slots 27 is first taken up and thereafter the levers 28 act directly on the links 26 to swing the levers 17 to their operative or control position. In the final position of the lever 30 in the return of said levers 17 to their control position it occupies the dotted line position shown in Fig. 1 from which it may be moved to the full line position shown in Fig. 1 without exerting any pull on the levers 17, due to the lost motion connection between the links 26 and slotted ends 27. For the digging condition of the bucket the lever 30 is allowed to assume the dotted line position shown in Fig. 1 so that the latch 33 associated with said lever will trip by the upper bevelled edge of the keeper 34 and engage under said keeper 34 when the bar 14 is moved toward the bail arm 12. The movement of the bars 14 toward the bail arms 12 to effect the locking engagement of the latches 33 with the keepers 34 and bring the bucket to a digging position is brought about by the stops 21, under the momentum of the rotary bucket, striking the rollers 20 with sufficient force to move the bars 14 to the digging position.

With the parts in a digging position, when the lever 30 is operated to release the latch 33 from the keeper 34 the pull of the hauling frame acts through the links 13 on the stops 36 to swing the bars 14 upwardly to the full line position shown so that the loaded bucket is in its dragging position and may be dragged to the place where its load is to be deposited.

It is also to be noted that if the scraper bucket is pushed backwards so that the bucket rotates in a clockwise direction such reverse action will not cause trouble since the stops 21 and 22 under these conditions will act to swing the stop levers 17 out of the way as they pass them.

From the foregoing description it will be noted that the positioning of the bucket in its different positions is brought about by positively acting mechanism whose action is not dependent upon the use of springs and that the positioning of the bucket in a digging position is positively effected by the bucket through energy stored up in the bucket as it rotates from its spreading to its digging position.

I desire it to be understood that this invention is not to be limited to any particular form or arrangement of parts except in so far as such limitations are included in the claims.

What I claim as my invention is:

1. In a device of the character described, the combination of a rotary scraper bucket, a hauling frame, a pair of control bars provided with journals for said bucket, means operatively connecting said bars with said frame, releasable stop means on said bars, stop means on said bucket cooperating therewith to control the angular position of said bucket, latch means for securing said bars to said frame when the bucket is in a digging position, and control means for said latch means and said releasable stop means and having a lost motion connection with the latter.

2. In a device of the character described, the combination of a rotary scraper bucket, hauling means, and means operable by the bucket as it turns relative to said hauling means for positively positioning said bucket in a digging position relative to said hauling means.

3. In a device of the character described, the combination of a rotary scraper bucket, a hauling frame, means connecting said hauling frame with the bucket for hauling said bucket in either a digging, dragging or spreading position, and means operated by the turning of the bucket from its spreading to its digging position to bring said connecting means into its position for hauling said bucket in its digging position.

4. In a device of the character described, the combination of a rotary scraper bucket, hauling means, and means operable through the momentum of the bucket as it turns relative to said hauling means for positioning said bucket in a digging position relative to said hauling means.

5. In a device of the character described, the combination of a rotary scraper bucket, a hauling frame, a pair of control bars provided with journals for said bucket, means operatively connecting said bars with said frame, stop means to limit the relative movement between said bars and frame, releasable stop means on said bars, stop means on said bucket cooperating with said releasable stop means to control the angular position of said bucket, latch means for securing said bars to said frame when the bucket is in a digging position, and control means for said latch means and said releasable stop means.

6. In a device of the character described the combination of a rotary scraper bucket, a hauling frame, a pair of control bars provided with journals for said bucket, links operatively connecting said bars with said frame, adjustable stop means for limiting the movement of said links and thereby controlling the depth of the cut, releasable stops on said bars, and stops on said bucket engageable with said releasable stops in different angular positions of said bucket.

7. In a device of the character described, the combination of a rotary scraper bucket, articulated hauling means, said bucket mounted to revolve relative to said hauling means to a digging position, and means operable by the bucket as it turns relative to said hauling means to move parts of said hauling means relative to each other for positioning said bucket in a digging position.

JOSEPH H. KERBER.